M. ROOS.
Vegetable-Cutters.

No. 196,044. Patented Oct. 9, 1877.

WITNESSES:
C Clarence Poole
Jas H Evans

INVENTOR:
Matthias Roos
per atty.
A H Evans &c.

UNITED STATES PATENT OFFICE.

MATTHIAS ROOS, OF CHICAGO, ILLINOIS.

IMPROVEMENT IN VEGETABLE-CUTTERS.

Specification forming part of Letters Patent No. 196,044, dated October 9, 1877; application filed September 3, 1877.

*To all whom it may concern:*

Be it known that I, MATTHIAS ROOS, of the city of Chicago, Cook county, State of Illinois, have invented certain new and useful Improvements in Vegetable-Cutters, of which the following is a clear, full, and exact description, reference being had to the accompanying drawings, making a part of this specification, in which—

Figure 1:
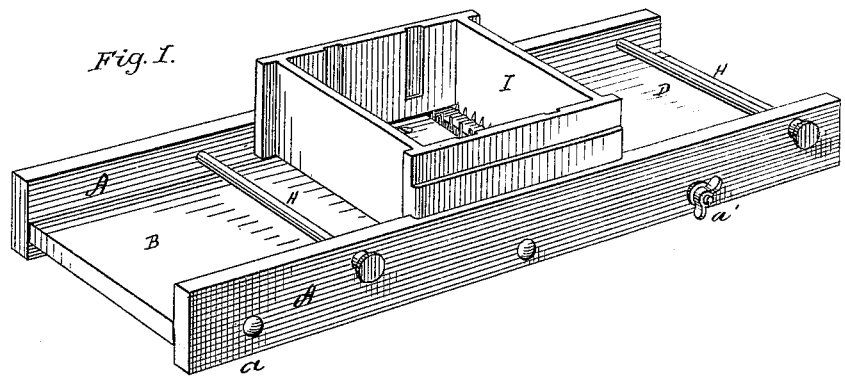
Figure 2:
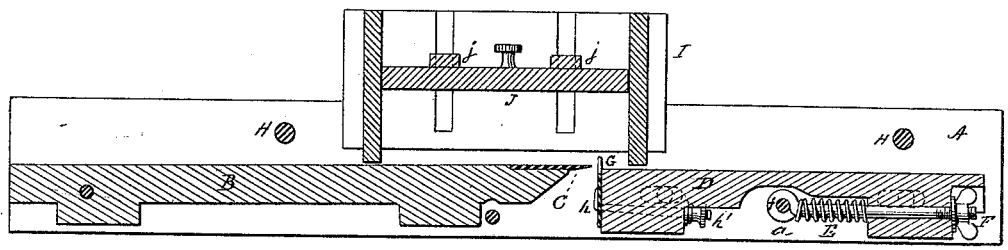
Figure 3:
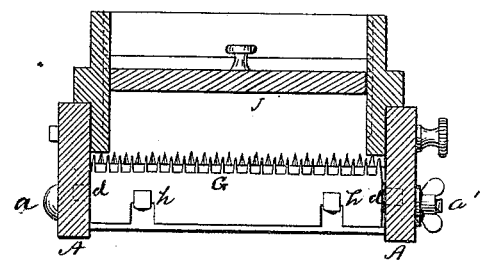

Figure 1 is a top or plan view. Fig. 2 is a longitudinal sectional view. Fig. 3 is a cross-sectional view.

This invention relates to improvements in vegetable-cutters, whereby it is adapted to split and slice the vegetables at the same operation; and the invention consists in the general construction and arrangement of parts, as will be hereinafter fully described.

In the drawings, A A represent the side bars of the frame, secured together by bolts and nuts $a$ $a'$. B represents the knife-board, and C the knife secured thereto by screws or otherwise. This knife-board is pivoted at its rear end between the side bars A A by the bolt and nut $a$ $a'$, whereby it is adapted to be adjusted to regulate the size of the slices or cuttings of the vegetables to be cut, and also to be raised in position for the knife to be ground or sharpened.

D represents a board arranged to slide in the grooves $d$ $d$ of the side bars, and this board is adjusted to and from the knife-board by means of the spiral spring E, eyebolt and nut F $f$, said eyebolt being secured to one of the cross-bolts, as clearly shown in Fig. 2.

To the front of the board D is secured a splitting-blade, G, having its cutting-teeth arranged in front of, and at right angles to, the slicing-knife C, for splitting the vegetables just before reaching the slicing-knife, and this splitting device is removably secured by clamping bolts and nuts $h$ $h'$, and it is adjusted to and from the slicing-blade, to regulate the size of the cuttings, by means of the spring and eyebolt above described.

H H are two transverse rods or stops arranged above the boards B D, for the purpose of limiting the movement or stroke of the sliding hopper I, for containing the vegetables to be cut, said hopper being provided with a follower, J. This hopper fits between the side boards, and is provided with cleats $j$ $j$, which rest on top of said side boards, and form a support for the hopper. The bottom of the rear board of the hopper is provided with a series of notches, which correspond with the teeth of the splitting-blade, whereby the end board is prevented from striking against the teeth and injuring them.

The operation of the device is obvious from the foregoing description.

Having thus described my invention, what I claim as new, and desire to secure by Letters Patent, is—

1. The combination, in a vegetable-cutter, of the pivoted knife-board B, having slicing-knife C, and adjustable board D, having adjustable splitting-knife G, arranged relatively to each other, substantially as and for the purpose set forth.

2. The combination, with the board D, having splitting-knife, of the bolt $a$, eyebolt $f$, nut F, and spiral spring E, substantially as and for the purpose set forth.

MATTHIAS ROOS.

Witnesses:
    FRED. W. WOLF,
    JNO. D. PATTEN.